United States Patent [19]

Mizusawa

[11] Patent Number: 4,701,064
[45] Date of Patent: Oct. 20, 1987

[54] BALL JOINT
[75] Inventor: Akira Mizusawa, Yokohama, Japan
[73] Assignee: Nifco Inc., Yokohama, Japan
[21] Appl. No.: 924,931
[22] Filed: Oct. 30, 1986
[30] Foreign Application Priority Data
Nov. 12, 1985 [JP] Japan ............................. 60-172978[U]
[51] Int. Cl.[4] ............................................. F16C 11/06
[52] U.S. Cl. ....................................... 403/71; 403/141
[58] Field of Search ..................... 403/71, 76, 141, 122
[56] References Cited

U.S. PATENT DOCUMENTS 3,861,812  1/1975  Ito ........................................... 403/71
4,568,216  2/1986  Mizusawa ........................ 403/122 X

FOREIGN PATENT DOCUMENTS 2712118  10/1977  Fed. Rep. of Germany ...... 403/141
59-77120   5/1984  Japan .
506722     6/1971  Switzerland ......................... 403/141

Primary Examiner—Andrew V. Kundrat
Attorney, Agent, or Firm—Trexler, Bushnell, Giangiorgi & Blackstone, Ltd.

[57] ABSTRACT

A ball joint consisting of a plastic one-piece molding comprises two halves having substantially the same shape and each consisting of a shell having a semi-spherical recess and a mounting portion provided on the shell for mounting the ball joint on a work. The two halves are coupled together by a hinge and are capable of being joined together face to face by bending the hinge such that one half of a ball portion of a ball stud is received in the recess of each shell. The two halves can be mounted in a face-to-face joined state in a mounting hole of a panel.

6 Claims, 4 Drawing Figures

BALL JOINT

FIELD OF THE INVENTION AND RELATED ART STATEMENT

This invention relates to a ball joint constituting part of a linkage mechanism for operating an automobile wiper or the like or of a door hinge mechanism of a hatchback automobile rear door, to hold a ball portion of a ball stud, thereby coupling together the ball stud and a rod or like work.

Japanese Patent Public Disclosure SHO No. 59-77120 discloses a plastic ball joint which comprises two halves of substantially the same shape each having a shell with a semi-spherical recess and a mounting portion provided on the shell for mounting it on a work. The two halves of the ball joint are coupled together by a hinge, and they are closed together by bending the hinge such that the recess of each of them holds one half of the ball portion of the ball stud. In this state, the ball joint is mounted on a panel with the mounting portions locked in a mounting hole formed in the panel.

In this ball joint, each mounting portion depends from the bottom portion of each shell, and the lower ends of the two mounting portions are linked by the hinge. Thus, by bending the hinge the two mounting portions are closed together into a single portion, while the two shells hold the ball portion of the stud with one half of the ball portion received in each recess. In this state, the mounting portions are inserted through the mounting hole of the work, whereby the ball joint is mounted on the work to thereby couple the work and ball stud. In this ball joint, however, the two recesses facing each other are disposed above the surface of the work when the ball joint is mounted. That is, a large space is required above the work, so that the ball joint is not suited for use in a small space. Further, although the mounting hole of the work maintains the two mounting portions enclosed and closed together, the two recesses holding the ball portion of the stud, particularly their portions adjacent to the open end enclosing a stem portion of the ball portion, are upwardly spaced apart from the mounting portions. Therefore, the mounting hole of the work, although it encloses the two mounting portions, does not substantially contribute to the holding together of the two recesses. In other words, it is necessary to separately provide means for strongly holding together the two recesses in the closed state. Otherwise, a strong force externally applied to the ball portion of the ball stud will cause detachment of the ball portion by forcing apart the two recesses.

OBJECT AND SUMMARY OF THE INVENTION

An object of the invention is to provide a ball joint which can be readily used even in a small space and can reliably hold the ball portion of the ball stud against detachment even when a strong force is externally applied to the ball portion.

The ball joint according to the invention, like the prior art ball joint mentioned above, consists of a one-piece plastic molding. According to the invention, a connecting piece for engaging the bottom of the shells is provided, each of the halves is united by a hinge to each end of the connecting piece, and the mounting portions are provided on the side surface of the halves.

The two halves, which are united by the connecting piece, are joined together by bending the hinge at each end of the connecting piece. By so doing, the connecting piece comes to rest on the bottom of each shell, whereby a ball portion of a ball stud is held in the two recesses. When the ball joint in this state is forcibly inserted through a mounting hole formed in the work, the mounting portions provided on the side surface of the shells are hooked in the mounting hole of the work, so that the joint is mounted on the work with the shells enclosed in a face-to-face joined state in the mounting hole of the work. The ball joint according to the invention thus can be used in a small space as well. The detachment of the ball portion of the ball stud is prevented because the shells joined together are enclosed in the mounting hole of the work and are prevented from being forced part.

The above and other objects and features of the invention will become more apparent from the following detailed description with reference to the accompanying drawings.

DETAILED DESCRIPTION OF THE PREFERRED EMBODIMENT

Referring to the Figures, reference symbols "A" and "B" designate halves of a ball joint according to the invention. These halves have substantially the same shape. They respectively have shells $2a$ and $2b$ having semi-spherical recesses 1 and anchor-shaped mounting portions $3a$ and $3b$ projecting obliquely from the opposite sides of the respective shells. The two halves "A" and "B" are linked by thin hinges $5a$ and $5b$ to respective ends of a connecting piece 4, which is adapted to engage the bottom surface 1' of the shells $2a$ and $2b$. The halves "A" and "B" and connecting piece 4 are formed as a one-piece plastic molding.

The shells $2a$ and $2b$ have respective outer flanges $6a$ and $6b$ provided on their front side, on which recesses 1 of the shells are open. In this embodiment, the shells are provided with projections $7a$ and recesses $7b$ which engage one another when they are closed together. They are also provided with pawls $8a$ and $8b$ which mesh with one another when they are closed.

Figure 1:
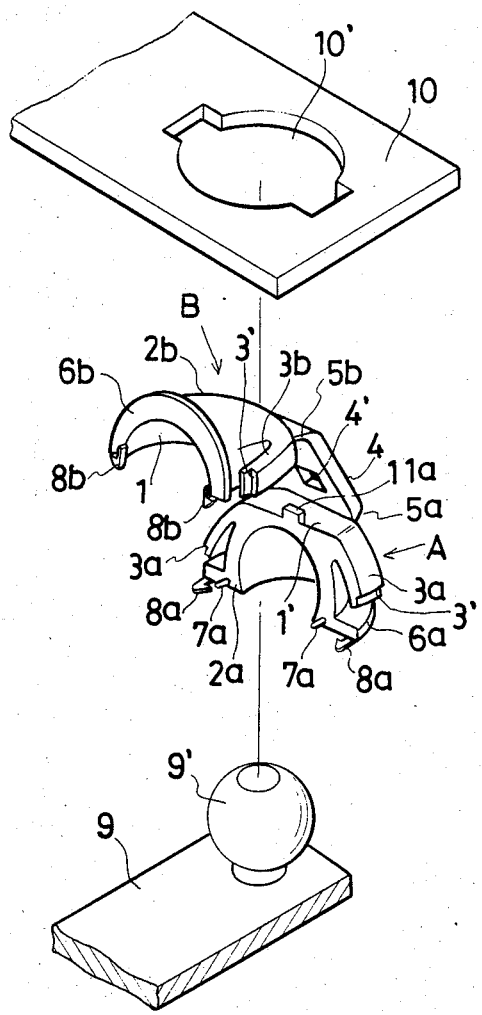
FIG. 1 is an exploded perspective view showing an embodiment of the ball joint according to the invention.
Figure 2:
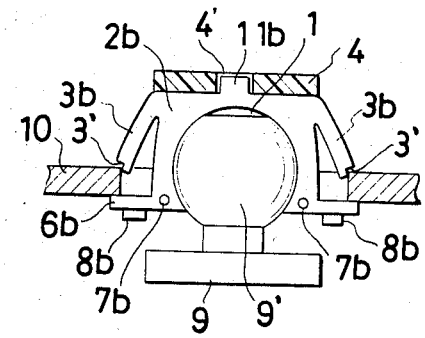
FIG. 2 is a sectional view showing the ball joint of FIG. 1 mounted on a work.
Figure 3:
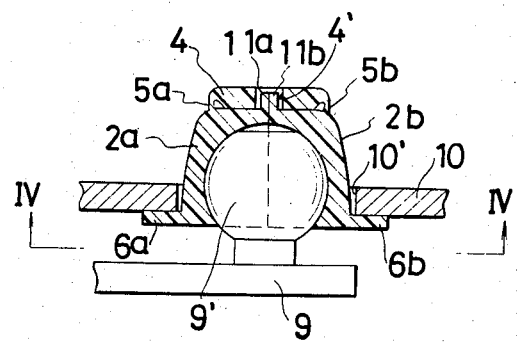
FIG. 3 is a sectional view similar to but different in angle by 90° from FIG. 2.
Figure 4:
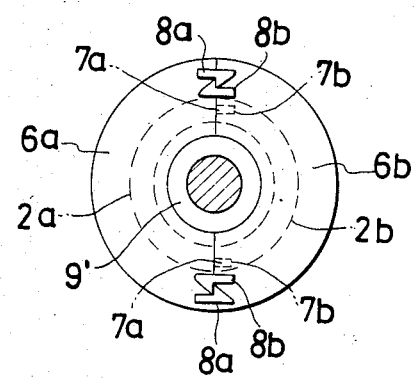
FIG. 4 is a sectional view taken along line IV—IV in FIG. 3.

In use, the two shells $2a$ and $2b$ are first opened as shown in FIG. 1, and then they are fitted on the ball portion 9' of ball stud 9 such that the halves of the ball portion are received in the respective recesses. The two shells $2a$ and $2b$ are then abutted face to face by bending the hinges $5a$ and $5b$ at the ends of the connecting piece 4. At this time, the projections $7a$ provided on the shell $2a$ are inserted into the recesses $7b$ provided on the side of the other shell $2b$, whereby the two shells are positioned relative to each other. Also, the pawls $8a$ and $8b$ on the two shells are meshed with one another as shown in FIG. 4 to hold the two shells in the joined state. Thus, the ball portion 9' of the ball stud 9 is held for rocking in all directions in the recesses 1 of the shells.

Subsequently, to couple the ball stud 9 to a work 10, the shells $2a$ and $2b$ joined together are forcibly inserted with the connecting piece 4 first through a mounting hole 10' of the work. As a result, the mounting portions 3a and 3b are pushed and inwardly flexed by the edge of the mounting hole 10'. When the flanges 6a and 6b of the shells reach the surface of the work, stepped free end portions 3' of the mounting portions 3a and 3b are hooked on the edge of the mounting hole, and the mounting portions 3a and 3b are slightly elastically restored. Thus, the halves "A" and "B" joined together are mounted on the work by the flanges 6a and 6b and mounting portions 3a and 3b providing residual restoring forces.

In the case of the instant embodiment, the mounting hole 10' formed in the work has a circular portion, in which the shells 2a and 2b joined together are fitted, and diametrically opposed notch portions, in which the mounting portions 3a and 3b are locked in the hooked state.

Thus, when a strong force tending to pull the ball portion 9' of the ball stud out of the recesses 1 of the shells is applied with the ball joint mounted on the work, the two halves of the joint will not be detached from the work. In addition, since the two shells joined together are enclosed in the mounting hole, they will not be forced apart, but the externally applied force is withstood to reliably prevent detachment of the ball portion 9'. When the two shells 2a and 2b are joined together by bending the hinges 5a and 5b of the connecting piece 4, they are positioned with respect to each other by projections 11a and 11b projecting from their bottom and hole 4' formed in the connecting piece 4, i.e., with the projections received in the hole.

Further, while in the above embodiment the mounting portions 3a and 3b are shown to be in an anchor-like form, this is by no means limitative.

As has been described in the foregoing, according to the invention the flanges 6a and 6b of the shells project from the surface of the work, and the shells are held in the state that they are joined together in the mounting hole of the work. The ball joint according to the invention thus can be used even in a small space. Further, in case where an external force tending to pull the ball portion of the ball stud out of the recesses is applied to the ball portion, the detachment of the ball portion can be prevented because the shells joined together are enclosed in the mounting hole of the work and prevented from being forced apart.

What is claimed is:

1. In a ball joint comprising a plastic one-piece molding for assembly with a ball stud, said molding comprising two halves having substantially the same shape and each comprising a shell having a semi-spherical recess, a mounting portion provided on said shell for mounting said ball molding on a support member, said two halves being coupled together by hinge means for relative movement between an open apart position in which said halves are attached only by said hinge means and a closed position during assembly with a ball stud such that one half of a ball portion of a ball stud is received in said recess of each shell, said two halves being inseparable when in said closed position, each of said halves being coupled by a respective hinge member to a connecting member which bridges said halves in said closed position, and wherein said mounting portions project from respective side surfaces of said shells.

2. The ball joint according to claim 1 wherein each of said shells comprises an exterior, bottom surface oppositely located with respect to an opening of said recess through which said ball stud projects from said recess, and wherein said connecting member engages each of said bottom surfaces, in said closed position of said halves.

3. The ball joint according to claim 1 wherein said hinges are provided on opposing ends formed on said connecting member.

4. The ball joint according to claim 1 wherein each of said halves further comprises a projection removably extending into an aperture formed in said connecting member, in order to promote alignment of said recesses in the closed position of said halves.

5. The ball joint according to claim 3 wherein each of said halves comprises a semi-annular, radially outwardly projecting flange formed adjacent said opening and spaced from said mounting portion for cooperation therewith to retain said ball joint upon said support member.

6. A ball joint linkage comprising a plastic one-piece molding for assembly with a ball stud, said molding comprising two halves having substantially the same shape and each comprising a shell having a semi-spherical recess, a mounting portion provided on said shell for mounting said ball molding on a support member, said two halves being coupled together by hinge means for relative movement between an open apart position and a closed position during assembly with a ball stud such that one half of a ball portion of a ball stud is received in said recess of each shell, said two halves being inseparable when in said closed position to form a ball joint, each of said halves being coupled by a respective hinge member to a connecting member which bridges said halves in said closed position, each of said halves further comprising a semi-annular, radially outwardly projecting flange, said support member having an aperture through which said ball stud projects in said assembly and closed position of said halves, wherein the periphery of said support member aperture is clamped between said mounting portions and said respective flanges to secure mounting of said ball joint on said support member.

* * * * *